July 5, 1932. G. P. BERRY 1,865,815
VACUUM BRAKE OPERATING MECHANISM
Filed Nov. 4, 1929 2 Sheets-Sheet 1
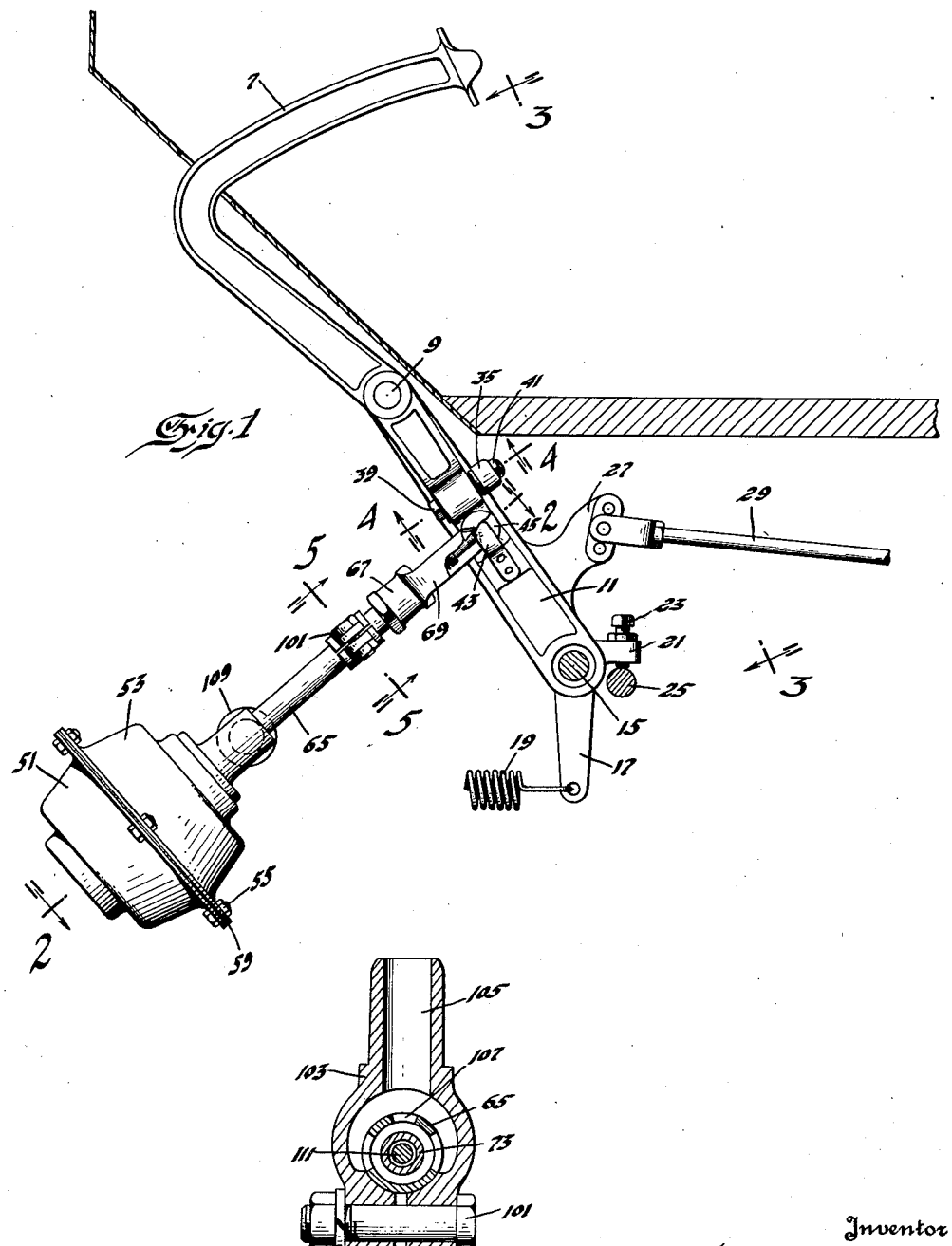

July 5, 1932. G. P. BERRY 1,865,815
VACUUM BRAKE OPERATING MECHANISM
Filed Nov. 4, 1929 2 Sheets-Sheet 2
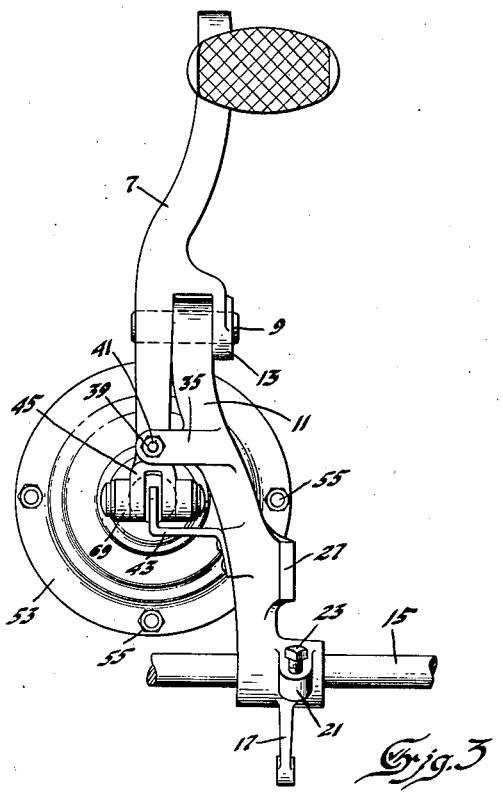
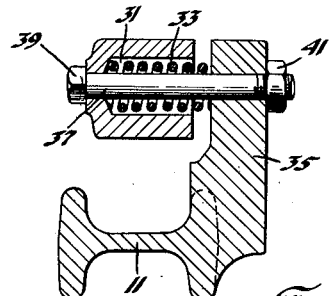
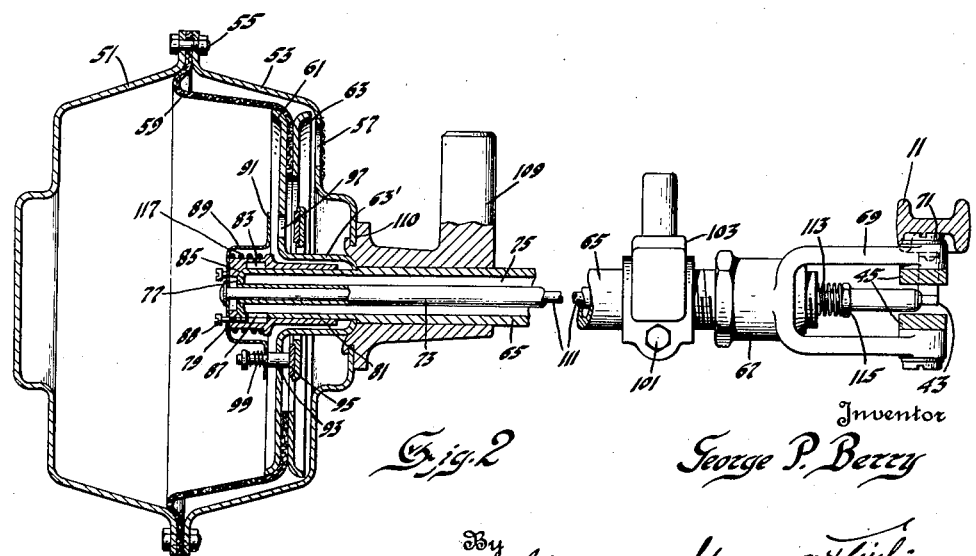
Inventor
George P. Berry
By Blackmore, Spencer & Hirsh
Attorneys Patented July 5, 1932

1,865,815

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

VACUUM BRAKE OPERATING MECHANISM

Application filed November 4, 1929. Serial No. 404,794.

This invention relates to brakes and particularly to mechanism under control of an operator for applying the brakes of vehicles.

The invention makes use of a pedal or other manually operable lever, a brake lever, connecting means from the latter to the brakes, a fluid pressure power cylinder, a control valve, the operation of the valve being controlled by relative movement between the pedal and brake lever.

The invention has for its object to simplify the structural arrangements designed to facilitate the assembly of the device on the vehicle, to provide for a reaction upon the pedal in proportion to the intensity of the power braking instrumentality, to make use of the known "follow-up" arrangements whereby the pedal must be advanced in order to continue the power means in action and also to provide an arrangement wherein the manual effort not only renders active the power cylinder through its control valve, but also affords the means for a direct application of the brakes through manually applied pressure. The invention is disclosed in the accompanying drawings wherein Figure 1 is a side elevation of the parts in assembled relation, Figure 2 is a section substantially on line 2—2 of Figure 1, Figure 3 is a view of the assembly device as seen from line 3—3 of Figure 1, Figure 4 is a section on line 4—4 of Figure 1 and Figure 5 is a section on line 5—5 of Figure 1.

Referring by reference characters to the drawings, numeral 7 designates the pedal. This pedal, instead of being rotatable on a fixed pivot, is mounted to turn on a pivot 9 carried on the end of a brake applying lever 11. For the purpose of providing a pivotal connection the pedal 7 is provided with an offset as at 13, the offset and the pedal arm straddling the end of brake lever 11. The brake lever is itself pivoted on a fixed pivot 15. The brake lever has a downwardly directed arm 17 to which is connected a retracting spring 19. The brake lever also has an arm 21 adjacent its pivot in which is adjustably supported a screw 23 for contacting with a stop 25 whereby the brake lever 11 is limited in its reverse movement. Brake lever 11 also has an arm 27 to which is connected a link 29 designed to be connected to any suitable brake construction. The pedal 7 is continued a little way beyond its pivot 9 and at its end is formed with a recess 31. This recess contains a spring 33 which is in abutment with the bottom of the recess and with an arm 35 extending from the brake lever 11 over the recess as shown in Figure 4. A bolt 37 has its head 39 engaging the lever 7, and extends through the recess and the part 35 of brake lever 11. The nut 41 is secured to the bolt at such a position that this portion of the pedal has a limited motion along the bolt between its head 39 and the face of the extension 35. Secured to the brake lever 11 is an angular plate 43. This angular plate extends between bifurcations 45 at the extreme end of the pedal. The power unit or power cylinder is comprised of two conical members 51 and 53 having their portions of larger diameter flanged and secured together by fastening means 55. One of these two conical members 51 has its base completely closed and the other is provided with air openings 57. Clamped between the flanges and held by fastening means 55 is a conical foldable diaphragm 59. The portion of the diaphragm of smaller diameter is clamped between a piston member 61 and a ring 63, the piston member being formed with a hub portion 63' which is rigidly secured to a tubular piston rod 65. At its outer end there is secured to the piston rod a member 67 provided with forks 69. These forks 69 are secured by fastening means 71 to the forked end 45 of the pedal. Associated with the tubular piston rod is a concentric tube 73 whereby an annular space 75 is formed between the tubes 65 and 73. At the outer end of these tubes 65 and 73 the annular space is closed in any desired manner. This space is also closed at the inner ends of the members 65 and 73, the member 65 having a head 77 closing the annular space and externally formed with the valve seat 79. Slidably mounted around the inner end of the tubular piston rod 65 is a valve member 81. This valve member 81 is formed with a groove 83 and a valve face 85, the latter to at times engage the valve seat 79. The groove 83 communicates with the annular space by means of openings 87 formed in the tubular member 65. Extended inwardly from the inner end of the valve member 81 are bolts 88, there being a space on the shank of the bolt between its head and the valve member 81 for the sliding movement of a cup-shaped member 89. The cup-shaped member has flanges 91. Extending through suitable openings in the piston member 61 are a series of bolts 93. Between the heads of the bolts and the shoulders provided on the bolts is a valve ring 95, designed when the bolts 93 are moved inwardly to close openings 97 in the piston. The flange 91 of the cup seats on the shoulders of the bolt and springs 99 are in abutment with said flange and other abutments on the ends of the bolts. The annular space 75 is intended to afford communication between the chamber of the power cylinder to the left of the diaphragm and a source of suction as for example the manifold of the engine when the valve face 85 is raised from its seat 79. To that end there is clamped by fastening means 101 about the tubular member 65 an attachment 103 to which may be connected any suitable tubular member extending from the manifold of the engine. Communication is afforded through an opening 105 in this attachment through openings 107 into the aforesaid annular space 75. For supporting the power cylinder any suitable means may be provided. There is shown in the drawings an attaching device 109 which is to be itself supported on the frame or other convenient part of the vehicle and is also attached as at 110 to the conical member 53. This member 109 may afford the guiding means for the tubular piston rod 65 as shown in the drawings. For operating the valve there is provided a rod 111 reciprocably mounted within the inner tubular member 73. The inner end of this rod is connected to the cup 89 at the center of its bottom portion. The rod 111 extends outwardly into substantial alignment with the axes of fastening means 71, between the forks 69 and the bifurcations 45. It there engages the end of the angular member 43 carried by brake lever. A spring 113 surrounds the rod 111 between the forked portions 69 and is in abutment at one end with the portion of 67 between the forks and with a second abutment 115 on the rod 111. There is also to be mentioned a spring 117 which surrounds the valve member 81, engages a shoulder thereon at one end and the bottom of the cup at its other end, this spring, being designed to effect the closure of the suction valve constituted by the parts 79 and 85.

The operation of the device described above is substantially as follows: The figures of the drawings show the parts in their position when the brake is released. The portion of the power cylinder to the right of the diaphragm is in communication with the air through openings 57, and the portion to the left is also in communication with the air since the openings 97 in the piston are not closed by the valve ring 95. When the pedal is depressed for the purpose of applying the brake there first occurs a combined movement of pedal 7 and lever 11 to take up clearance at the brakes, an inward movement of the plunger occurring in consequence of this movement. Then follows a movement of pedal 7 about its pivot 9 relative to the brake lever 11 since the resistance at the brakes has become greater than the resistance offered to such relative movement by the spring 33. When such movement occurs the bifurcated end of the pedal pulls the piston rod outwardly while at the same time the angular member 43 in engagement with the outer end of rod 111 prevents any outward movement of the cap 89 and the air valve element 95 carried thereby. As a result of the relative movement between the piston and the air valve element the openings 97 are first closed by the valve ring 95. A little further movement causes the valve seat 79 to move to the right away from the valve face 85 of the valve member 81, since the valve member 81 is restrained from moving to the right with the valve seat 79 by engagement of the cap, held by rod 111, with the heads 88 of the bolts. Thereupon the suction of the manifold is operable through the annular space 75 and to the left of the diaphragm through the opening valve. Thereupon the diaphragm is in an unbalanced condition between sub-atmospheric pressure on one side and atmospheric pressure on the other and the piston moves to the left. The developing suction in the power cylinder is accompanied by an inward push by atmospheric air upon the plunger which carries along the rod 65 connected to the end of the pedal. This movement continues until the suction derived force applied to the lower arm of pedal 7 is in balance with the force manually applied to the upper arm of the pedal. When this balance is reached the relative movement ceases and the suction valve has closed. The combined forces balanced as to each other about pivot 9, operate about pivot 15 to apply the brake through the instrumentality of connecting rod 29. When the suction valve closes and the forces are in balance, as described, a braking force determined by the pressure of the foot on the pedal which has a definite ratio to the force applied by the servo suction mechanism, is in action. Thereafter the operator may release the pedal and the parts will be restored to their position of release as shown in the drawings or he may by further movement of the pedal repeat the action as described above. It will be seen from Figure 4 that when the parts are in their position of release the recessed portion of the pedal engages the bolt head 37. It may be explained that when the recessed portion of the pedal engages the portion 35 of the brake lever the suction valve is in its position of extreme opening and the fluid pressure means is operating at its maximum. As will appear from the above description when the recessed portion is midway between these extremes the forces exerted by the operator on the pedal and also by the power device on the pedal may be considered as two forces balanced about point 9 acting to swing the brake lever 11 and apply the brake lever. Should the operator wish to increase the power of the suction brake he not only holds the pedal sufficiently to keep the recessed portions midway between the member 39 and the extension 35 but he applies sufficient pressure to cause the recessed portion to engage the member 35 whereupon whatever additional pressure he applies is directly effective through the mechanical linkage to apply the brakes.

The construction shown is easily applied to almost any vehicle since the pedal and the brake lever occupy scarcely any more space than the conventional brake pedal. The reaction of the valve within the power cylinder and the concentric relation of the rod 111 with the piston rod not only simplifies the construction but it makes it possible to employ these parts without interfering with other vehicle accessories. The action of applying the brake is substantially the same as in the case of an ordinary brake pedal, the operator feels exerted against his foot a pressure which is proportional to the intensity of the servo brake operating means so that he is always aware of the varying intensity of brake application. At any time he is free to supplement the servo brake by his own manually applied force and if the servo brake should fail he operates the brake in precisely the same way as the usual brake is operated.

I claim:

1. Power brake operating mechanism comprising a brake lever, a brake pedal pivoted adjacent an end of one arm of said lever, said lever having a second arm, a brake link connected to said second arm, said pedal having a part extended along the brake lever beyond its pivot, means associated with said brake lever and pedal extension to limit the relative movement between said pedal and brake lever, power means including a power cylinder, a piston and a piston rod together with a valve incorporated in said power means, an operating rod for said valve slidably concentric with reference to said piston rod, said piston rod being connected to said pedal, and means on said brake lever to contact said valve rod.

2. In a fluid pressure operated device, a manually operable lever, a power lever, means pivotally connecting said levers, a power device including a plunger therein, valve means comprising parts relative movement of which renders the power device operative to perform work, means rigidly connected to said plunger and connecting one of said parts to said manually operable lever, and other means operably connecting the other of said parts to the power lever whereby the power device reacts on the manually operable lever to balance the manually applied force and whereby the manually applied force together with the force derived from the power device may cooperate to rotate the power lever.

In testimony whereof I affix my signature.

GEORGE P. BERRY.